Figure 1:
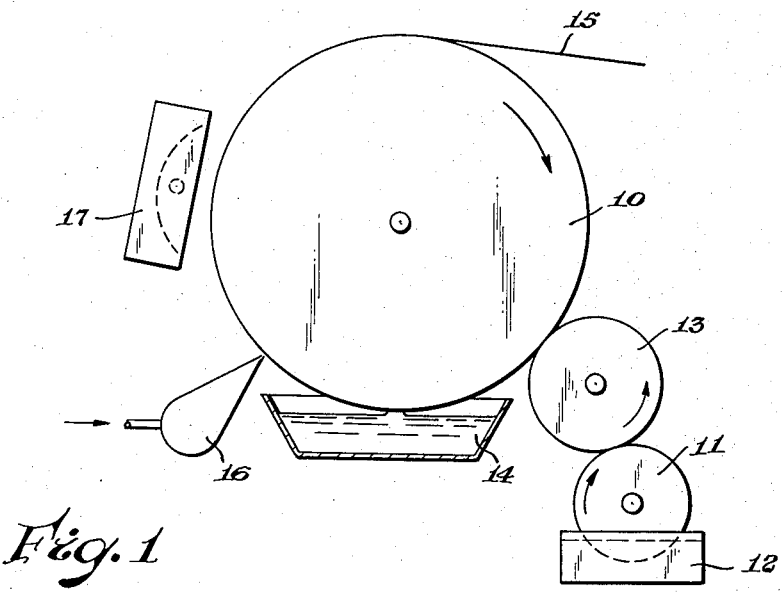

April 7, 1959   R. E. GUNDERMAN ET AL   2,880,466
PROCESS FOR PREPARING FILMS FROM POLYMER LATEXES
Filed Jan. 14, 1957

INVENTORS.
Roland E. Gunderman
Max E. Elder
BY
Griswold & Burdick
ATTORNEYS

United States Patent Office 2,880,466
Patented Apr. 7, 1959

2,880,466

PROCESS FOR PREPARING FILMS FROM POLYMER LATEXES

Roland E. Gunderman, Clare, and Max E. Elder, Midland, Mich., assignors to The Dow Chemical Company, Midland, Mich., a corporation of Delaware Application January 14, 1957, Serial No. 634,125

7 Claims. (Cl. 18—57)

This invention relates to an improved process for preparing thermoplastic films from polymer latexes. More particularly it relates to such a process involving the continuous localized coagulation of the latexes.

Polymer latexes are particularly useful forms from which to prepare continuous articles, such as films, tapes, and filaments. The number of procedural steps required to convert a latex into a continuous article is at a minimum, the steps are operationally simple, the capital investment in film forming equipment is low, the equipment is easy to clean and maintain and is fairly versatile in being useful for many different latexes without major modification. In preparing such articles the latex may be cast into the approximate shape desired on a supporting surface by using a transfer roll, doctor blade, air knife, or the like. The cast wet shape may be then dried and fused either sequentially or simultaneously. That method or technique, however, is limited to a relatively few latexes which are capable of film formation by air drying. More recently a technique was developed whereby a film forming latex was cast on a supporting surface wetted with an electrolyte coagulant solution to form a porous coagulum which was then washed, dried, and fused. Although the latter technique increased the number of useful latexes which could be formed into continuous coherent articles, there was still a large family of polymers and copolymers with which the porous coagulum was so incoherent and weak as to make further processing extremely difficult and in many cases impossible. Included among those difficultly processable latexes are the polymers and copolymers of vinyl chloride and of vinylidene chloride with each other or with other monoethylenically unsaturated comonomers, such as the alkyl acrylates. It would be desirable if an improved process could be found for fabricating these difficultly processable latexes into continuous coherent articles, and it is the principal object of this invention to provide such an improved process.

It is a further object to provide such a process which is readily adaptable to existing equipment.

The above and related objects are realized with a process wherein an electrolyte-coagulable polymer latex is cast and electrolyte coagulated into approximately the desired shape as a continuous, coherent, porous coagulum which is washed to remove substantially all of the electrolyte coagulant, the excess water removed without destroying the porosity of the coagulum, and the coagulum then dried and fused. The improvement in the above process which is contemplated by this invention is the subjecting of the freshly cast porous coagulum to relatively mild heating prior to washing. By the use of this improvement polymer latexes which could not be fashioned by prior procedures into continuous coherent articles are capable of such fabrication.

Although any film-forming, electrolyte-coagulable, polymer latex may be used in the process of this invention, it has been found to be especially useful and necessary with the latexes of the polymers and copolymers of vinyl chloride and vinylidene chloride with each other or with other monoethylenically unsaturated comonomers, such as the alkyl acrylates, and acrylonitrile. Within this family of difficultly processable polymer latexes it has been found that those latexes of the normally crystalline vinylidene chloride copolymers are particularly troublesome and such latexes accordingly represent preferred materials for use in the process. The useful latexes must be electrolyte coagulable into a continuous, coherent coagulum. It is not essential that the continuous, coherent coagulum be self-supporting, impermeable, transparent, or commercially useful by air drying, but it is necessary that the coagulum be a unitary integral article, however weak it may be. It is known that some latexes require minor treatment to aid their inherent film forming characteristics, their casting ability, or their coagulability. For example it is frequently advantageous to add a very small amount of a hydrophilic, colloidal thickener, such as the water-soluble cellulose ethers, and to adjust the pH of the latex prior to casting. Such techniques which enhance the film formability of the latex are intended to be within the scope of the invention.

The latexes may be prepared by any of the known procedures for polymerization in aqueous emulsion. Typically the monomer or monomers are dispersed in an aqueous solution of from about 0.05 to 5 percent polymerization catalyst, such as potassium persulfate or hydrogen peroxide, and from about 0.05 percent of a surface active agent as an emulsifier. Polymerization is initiated by heating the emulsified mixture usually between 35 degrees C. and 100 degrees C. and continued by maintaining the polymerizing emulsion at the selected temperature. After the polymerization has reached the desired conversion of monomer to polymer, the latex is filtered to remove any precoagulum and stabilized to storage by the addition of a small amount of a surface active agent.

Latexes which are to be used in forming continuous coherent articles, such as films, should preferably contain from about 30 to about 50 percent by weight of non-volatile solids. When less than about 30 percent by weight of non-volatile solids are present in the latex, no useful, continuous coherent articles can be produced by simple deposition of the latex. Latexes having appreciably more than 50 percent by weight of non-volatile solids are difficult to prepare and are extremely sensitive to mechanical shear and to storage and may coagulate prematurely.

It is also known that the quality of continuous coherent articles prepared by the deposition of a latex is dependent upon the latex particle size. The particle size is a function of the kind and concentration of emulsifier, the temperature of polymerization, and the rate of agitation used in forming the initial dispersion. Most latexes will generally not form films by simple deposition unless substantially all of the particles are under 3000 angstrom units in diameter. Most desirable results are obtained when the majority of the dispersed particles have diameters between 400 and 2000 angstrom units. Means for making latexes whose particles are of those dimensions are known.

The coagulants useful for coagulating polymer latexes are well-known. Typically they consist of aqueous solutions of bi- and polyvalent inorganic salts, such as calcium chloride, magnesium chloride, and aluminum sulfate. It has been found that a solution of from about 5 to about 20 percent concentration provides the best coagulating characteristics. The greater the concentration that is used, the more extensive will the washing step have to be to remove residual electrolyte. Such electrolytes frequently have a deleterious effect on the stability of the polymer. It has also been found to be desirable to add a small amount of surface active agent to the aqueous coagulant solution to improve the wetting qualities of the solution.

The operation and advantages of this process will be more apparent from the following description and annexed drawings which represent schematically a preferred and illustrative apparatus for carrying out the steps of the process.

Figure 2:
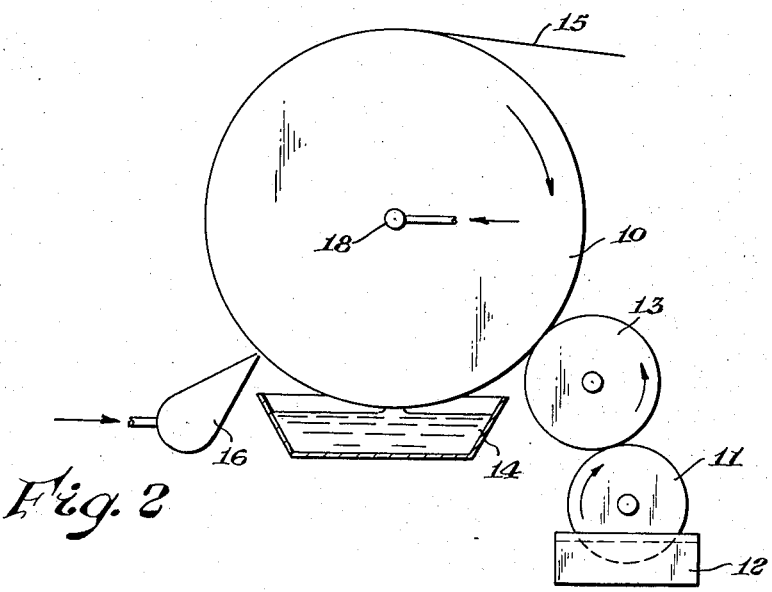

In the drawings:

Figure 1 represents a schematic elevation of an apparatus employing external heating means, and Figure 2 represents a schematic elevation of an apparatus employing internal heating means.

In the embodiment illustrated in Figure 1 a large rotatably driven, smooth-surfaced drum 10 is used as a casting surface. The surface 10 of the drum is first wetted with aqueous electrolyte coagulant solution. The wetting is conveniently accomplished using a transfer roll technique wherein a pickup roll 11 rotating partially in a coagulant bath 12 is in contact with a transfer roll 13 which in turn is in contact with the drum 10. The transfer roll technique assures a constant wetting of the drum surface 10. As the drum 10 rotates further the wetted surface dips into or touches a latex bath 14 forming a wet latex-coagulant film 15. Excess water and latex is removed from the wet film by a planiform air blast, sometimes called an air knife 16, which is directed at a slight angle to the surface of the wet film 15. The rotating drum surface 10 next passes under a radiant heating means 17 such as a quartz bar heater, which strengthens and conditions the film 15 without destroying its porosity. It is only necessary that the temperature of the wet film 15 be raised to about 35 to 70 degrees C. to achieve the desirable result. If the film 15 is not raised to at least 35 degrees C., there is little improvement noticed in the coagulum characteristics. If temperatures of much over 70 degrees C. are used, there is a danger that much of the porosity will be lost, and the other processing steps made more difficult. It should be apparent that the actual temperature to be used to give optimum results will depend upon the polymer composition, the latex characteristics, the thickness of the wet film and other variables. An investigator will be able to make a judicious choice of temperature by examining the coagulum following the heating step.

Following the warming step the continuous, coherent, porous coagulum is stripped from the drum surface, washed, dried, and fused.

In the embodiment represented in Figure 2 the apparatus consists of the same elements in the same relative positions except that the external radiant heating means 17 is omitted. In this embodiment the axis of drum 10 is fitted with a conventional rotary union 18 and heat transfer fluids circulated therethrough to maintain the drum surface at a temperature of from 35 to about 70 degrees C.

The drum or other supporting surface should be contacted with the latex as soon as possible after wetting with coagulant to avoid drying of the cagulant on the drum surface. This is particularly important when a heated drum or supporting surface is employed as in the embodiment of Figure 2 since that heat increases the drying problem. Dried coagulant does not provide good continuous localized coagulation characteristics.

Plasticizers, stabilizers, fillers, pigments, and the other additives commonly incorporated into polymer compositions may be employed in this process by either blending them into the latex prior to casting or by passing the wet washed coagulum through a solution of the additive prior to fusion.

The thickness of the continuous, coherent article is easily controlled by the setting of the air knife, doctor blade, or other device, by the time of contact of the drum with the latex, by the concentration of the coagulant, and by the latex compositions. The process operates best when the article has a thickness of from 0.001 to 0.003 inch. When it is attempted to prepare articles of much greater thickness than 0.003 inch by the continuous localized coagulation of a latex, it is found that it is difficult to achieve uniform coagulation, the coagulant is difficult to wash away, and the wet article is difficult to dry and fuse.

In a specific example an aqueous latex prepared by the emulsion polymerization of 91 percent by weight of vinylidene chloride and 9 percent by weight of acrylonitrile and having 40 percent solids was formulated by stirring in 5 percent by weight based on the weight of nonvolatile solids of ethyl phthalyl ethyl glycolate as a plasticizer. One percent of the dioctyl ester of sodium sulfosuccinic acid was added to reduce the surface tension of the latex to 38.8 dynes. An 8 inch steel drum having a Heresite surface was wetted with a 10 percent aqueous calcium chloride solution containing 0.4 of a nonionic wetting agent. The wet drum surface was then rotated through a bath of the formulated latex and then through the blast of an air knife. The drum was maintained at a temperature of 60 degrees C. by circulating hot water therethrough. Also the drum was rotated to give a peripheral speed of 20 feet per minute. The coagulum formed on the roll was continuous and coherent, could be stripped from the roll and passed through a water bath, then air dried, and finally fused at 170 degrees C.

By way of contrast when the process was repeated omitting the heating of the drum, the coagulum could not be stripped from the drum without breakage.

In a further example a latex prepared by the emulsion polymerization of 30 percent by weight of vinylidene chloride and 70 percent by weight of vinyl chloride and containing 47.4 percent by weight of non-volatile solids was formulated with 1 percent of the dioctyl ester of sodium sulfosuccinic acid and 10 percent plasticizer. The drum, without any fluid circulating therethrough, was wetted with 10 percent aqueous calcium chloride solution then passed through the latex bath, finally subjected to the air knife blast. The wet drum surface was passed under a 1000 watt quartz bar heater placed 2 inches from the drum at a speed of 14 feet per minute. The porous coagulum was stripped from the drum, washed, then dried and fused into a continuous coherent film.

Similar results are observed when latexes of copolymers of vinylidene chloride and ethyl acrylate are processed in this manner.

The process of this invention allows the preparation of films, filaments, and other continuous, coherent articles from latexes which heretofore could not be used in the continuous, localized coagulation technique because of the inherent weakness of the coagulum.

We claim:

1. In a process for preparing continuous coherent articles from polymer latexes consisting of as a sequence of steps the wetting of a supporting surface with an aqueous electrolyte coagulant solution, the casting of an aqueous electrolyte coagulable latex of a polymeric material composed of a chloroethylene monomer and another monoethylenically unsaturated comonomer on said wet surface in a metered thickness, the washing of the so-formed coagulum to remove substantially all of said electrolyte, and the drying and fusing of said coagulum into a continuous coherent article, the improvement consisting of subjecting said coagulum to heating below the fusion temperature of said coagulum prior to said washing step and before said coagulum is stripped from said supporting surface.

2. The process claimed in claim 1 wherein said latex is one containing from about 30 to about 50 percent by weight of non-volatile solids.

3. The process claimed in claim 1 wherein said coagulum is heated to a temperature of from about 35 degrees C. to about 70 degrees C.

4. The process claimed in claim 3 wherein said heating step is achieved by maintaining said supporting surface at a constant temperature in said range.

5. The process claimed in claim 3 wherein said heating step is achieved by subjecting said coagulum to radiant heating means.

6. The process claimed in claim 1, wherein said polymeric material is composed predominantly of vinylidene chloride with a complementary amount of another monoethylenically unsaturated comonomer.

7. The process claimed in claim 6, wherein said monoethylenically unsaturated comonomer is acrylonitrile.

References Cited in the file of this patent

UNITED STATES PATENTS

| | | |
|---|---|---|
| 2,100,029 | Gammeter | Nov. 23, 1937 |
| 2,268,678 | Tingey | Jan. 6, 1942 |
| 2,549,864 | Toulmin | Apr. 24, 1951 |
| 2,707,805 | Smith | May 10, 1955 |